Patented Jan. 22, 1935

1,988,740

UNITED STATES PATENT OFFICE 1,988,740

PURIFYING PROPANE

Kenneth Kingman, Palos Verdes Estates, Calif., assignor to Union Oil Company of California, Los Angeles, Calif., a corporation of California No Drawing. Application August 21, 1933, Serial No. 686,174

9 Claims. (Cl. 260—169)

This invention relates to the process for the purification of diluents employed in oil treating systems. More specifically the invention relates to a process for the purification of diluents employed in dewaxing and/or extraction systems.

In the separation of wax from the wax containing oil, the oil is mixed with a diluent, such as gasoline, naphtha, propane, butane or ethane or mixtures thereof, and the diluted oil is then chilled to a temperature sufficiently low to precipitate the wax. The chilled mass is then filtered, settled or centrifuged for the separation of the precipitated wax from the oil and diluent. In dewaxing systems wherein normally gaseous hydrocarbon diluents are employed it is customary to dilute the oil with sufficient of the liquefied normally gaseous hydrocarbons to function both as refrigerant and diluent. For example, the waxy oil is diluted with liquefied propane and chilled to a temperature sufficiently low to precipitate the wax by vaporizing a portion of the liquefied propane under reduced pressure. The vaporization of the liquefied propane under reduced pressure chills the oil and remaining diluent to a temperature at which the wax precipitates. The chilled mass is then settled, filtered or centrifuged to separate precipitated wax from the oil and remaining diluent.

In wax separation processes wherein the wax is separated from the oil by filtration it is highly desirable to employ diluents which are relatively free from moisture. A small quantity of moisture present in these diluents renders the chilled mass difficult to filtrate. The moisture present in the diluent forms ice particles at the lower temperatures and these particles plug the openings in the filter and render it difficult to force the oil through the plate.

Furthermore, these ice particles collect in the mass of the wax cake on the filter leaf and in the bottom of the filter body. When the wax cake is subsequently dissolved and removed by circulating relatively warm oil through the filter body or through the filter leaves, the ice particles are melted and the resultant water absorbed by the filter cloth. Subsequent chilling of the filter prior to filtration operations freezes this water into a hard, impervious layer of ice which greatly impedes the passage of the diluted oil through the cloth.

I have discovered that it is desirable to remove the moisture from liquefied normally gaseous hydrocarbons employed in dewaxing oil. A number of methods may be utilized in removing the moisture from these diluents—for example—I may carefully rectify or distill the normally gaseous hydrocarbon prior to its use as a diluent in a dewaxing system for the removal of the moisture or water.

For example, the normally gaseous hydrocarbon may be separated from the contained water by distillation at such a temperature that the corresponding vapor pressure of the contained water is relatively low, and the moisture content of the resulting distilled vapors will be negligible. This separation may be made by distillation at a temperature of 40° F. or lower, and a pressure greater than atmospheric, or by rectification in a column in which the temperature of the vapors leaving the top tray is maintained at 40° F. or lower, and the pressure is greater than atmospheric, or at other temperatures and pressures such that the moisture content of the vapors leaving the distillation equipment will be negligible. For example, in removing moisture from propane by distillation, the distillation may be conducted at a pressure of 78 lb. per sq. in. absolute and a column top temperature of 40° F., and the resulting vapors condensed at a lower temperature and the same pressure or at atmospheric temperature after recompression. Under these conditions, the moisture content of the purified material would be less than 1%. If desired, this remaining moisture may be readily removed by one of the chemical methods listed below when complete removal is desirable.

Furthermore, I may treat the normally gaseous hydrocarbon with materials which have an affinity for the moisture present prior to its use in a dewaxing system—for example—normally gaseous hydrocarbons may be commingled with sulphuric acid which has a high affinity for water but does not react upon the normally gaseous hydrocarbon. The normally gaseous hydrocarbon treated with sulphuric acid may then be compressed and condensed for use in separating wax from oil, or if desired I may commingle liquefied normally gaseous hydrocarbons with sulphuric acid, allow the mass to stand in a quiescent state and remove the supernatant liquid comprising substantially moisture free diluent which may then be employed as a diluent in separating wax from oil without the attendant filtration difficulties set forth above. Other means may also be employed in removing moisture from the normally gaseous hydrocarbon diluent such as salt (sodium chloride), fused calcium chloride, anhydrous sodium carbonate or calcium oxide (lime). These chemicals have a greater affinity for the moisture than the normally gaseous hydrocarbons, consequently, by treating normally gaseous hydrocarbons with any one or more of these materials I am able to separate the major portion of the moisture present.

It is therefore an object of this invention to remove moisture from normally gaseous hydrocarbons employed in dewaxing systems.

It is another object of this invention to separate water from normally gaseous hydrocarbons by distilling the normally gaseous hydrocarbons under conditions which will substantially separate the water from the hydrocarbons.

It is another object of this invention to separate water from normally gaseous hydrocarbons or liquefied normally gaseous hydrocarbons by contacting these hydrocarbons either in the form of liquids or gases with chemicals or agents which have a greater affinity for water than the hydrocarbon itself. These agents include sodium chloride, sulphuric acid, sodium carbonate, etc.

As an example of the method of carrying out my process I commingle gaseous propane with sulphuric acid by injecting the gaseous propane into the bottom of a tower filled with coke. Into the top of the tower I introduce a stream of sulphuric acid. As the stream of sulphuric acid introduced into the top of the tower flows downward it coats the coke with a film of acid. The gaseous propane rising through the coke particles coated with a film of sulphuric acid gives up its water content to the sulphuric acid. From the top of the tower I remove relatively water free gaseous propane. This product may be compressed and liquefied in a conventional manner and then employed in dewaxing systems without any of the attendant difficulties which I have previously described.

As a further modification of the process I may inject liquefied propane into a body of sulphuric acid contained in a tower. Owing to its relatively low specific gravity the liquefied propane rises to the top of the sulphuric acid from which it may be decanted away. As the liquefied propane rises through this body of sulphuric acid it is dehydrated by the sulphuric acid. When the sulphuric acid has absorbed relatively large quantities of water from the propane, it may then be removed from the tower and distilled for the removal of the water. The sulphuric acid which has been separated from the larger portion of its water content by distillation may then be returned to the tower for re-use.

As a further example of the method of carrying out my process liquefied propane is commingled in a tower filled with fused calcium chloride chunks. After a thorough contact the liquid propane is decanted away from the calcium chloride. The propane treated in this manner is substantially free from water.

As a modification of the process described in the foregoing paragraph I introduce gaseous propane into the bottom of the tower filled with fused calcium chloride. From the top of the tower I remove gaseous propane substantially free from water and from the bottom of the tower I remove liquid calcium chloride containing water. The substantially water-free propane removed from the top of the column is then compressed and condensed in a conventional manner, and is ready for use in a dewaxing system wherein it is desirable to employ diluents which are substantially water free. The calcium chloride removed from the bottom of the tower can be recovered by heating this material to a temperature sufficiently high to remove the water and to fuse the calcium chloride.

Where sodium chloride or sodium carbonate or calcium oxide are employed as dehydrating agents I may place these materials in the column similar to the one employed for calcium chloride and then contact the propane in a liquid state or a gaseous state with these dehydrating agents for the separation of the water from the propane.

Another process which I have found suitable for separating water from light hydrocarbon diluents such as liquid propane, naphtha, etc. is to pass the liquid to be dehydrated through a capillary filter such as a filtrose plate. This plate is made from silaceous material which has been pressed together in the form of a slab and contains a large number of capillary or minute passageways. As the propane or other light liquid passes through this plate the water droplets or particles coalesce into relatively larger aggregations or particles and can be readily separated from the propane or other light liquid by settling or centrifuging. Upon settling the coalesced water particles being relatively heavier than the liquid from which it is being separated settle to the bottom of the settling vessel and can be removed from the dehydrated liquid.

It is therefore an object of this invention to pass propane, naphtha or other diluents containing water particles in a finely divided state, in suspension or emulsified with the diluent through a structure containing capillary passageways to coalesce the water into a form in which it is separable from the diluent.

Liquefied propane which has been dehydrated or dried by any of the foregoing methods may also be used in extraction systems or treating systems wherein it is desirable to employ a light hydrocarbon diluent which is relatively free from water.

For example it may be found desirable to employ substantially water-free propane in treating systems wherein oils are treated with sulphuric acid, clay, liquid sulphur dioxide, dichlorethylether, aniline, nitrobenzol, or metallic halides such as aluminum chloride or ferric chloride.

Other impurities present in the diluents such as hydrogen sulphide may be removed by contacting the gaseous or liquid diluents with caustic soda in the same manner as contacting these diluents for the removal of water.

This is especially true of light hydrocarbon gases which have been recovered from cracking stills and which are mixtures of saturated and unsaturated hydrocarbons such as methane, ethane, propane, butane, ethylene, propylene and butylene. These hydrocarbons are very useful as diluents or extracting mediums in dewaxing and/or extraction processes. However, it is desirable that they be separated from any hydrogen sulphide and/or mercaptans which may be present before use. If hydrogen sulphide, mercaptans, and/or water are present they can be removed simultaneously by treating the liquefied hydrocarbon either in a gaseous or liquid state with lime (CaO) or anhydrous sodium carbonate or a mixture of lime (CaO) and caustic soda or a mixture of caustic soda and anhydrous sodium carbonate.

It is therefore an object of my invention to remove hydrogen sulphide from hydrocarbon diluents which are employed in dewaxing or extraction systems.

It is another object of the invention to remove hydrogen sulphide and/or mercaptans by the use of agents which have a greater affinity for these impurities than the affinity of the diluent for these impurities. Furthermore, if desired I may also separate water along with these impurities by any of the foregoing described methods.

While I have described a method of dehydrating normally gaseous hydrocarbons for use in dewaxing and extracting systems, I do not wish to limit myself to these particular uses. Normally gaseous hydrocarbons or other diluents which have been dehydrated by any of the foregoing methods may be found to be useful for many other purposes.

I claim:

1. A process for the separation of water from a liquefied normally gaseous hydrocarbon containing a major portion of paraffinic hydrocarbons comprising commingling the liquefied normally gaseous hydrocarbon with a dehydrating agent and separating the liquefied hydrocarbon from the dehydrating agent and water.

2. A process according to claim 1 in which the dehydrating agent is sulphuric acid.

3. A process according to claim 1 in which the dehydrating agent is a mixture of sodium hydroxide and calcium oxide.

4. A process according to claim 1 in which the dehydrating agent is calcium chloride.

5. A process for the separation of water from a liquefied normally gaseous paraffinic hydrocarbon which comprises commingling the liquefied normally gaseous hydrocarbon with a dehydrating agent and separating the liquefied normally gaseous hydrocarbon from the dehydrating agent and water.

6. A process for the separation of water from a liquefied normally gaseous hydrocarbon containing a major portion of paraffinic hydrocarbons comprising distilling said liquefied hydrocarbon at a temperature and pressure at which the vapor pressure of the water is such that only small amounts of water vapor are carried over with the vapors of the said normally gaseous hydrocarbons, reconverting the vapors to the liquid state, commingling the liquefied normally gaseous hydrocarbon with a dehydrating agent and separating the liquefied hydrocarbon from the dehydrating agent and water.

7. A process according to claim 6 in which the dehydrating agent is sulphuric acid.

8. A process according to claim 6 in which the dehydrating agent is a mixture of sodium hydroxide and calcium oxide.

9. A process according to claim 6 in which the dehydrating agent is calcium chloride.

KENNETH KINGMAN.